June 19, 1928. 1,674,583

J. C. YOUNG

RELEASABLE DUMPING BODY SECURING MEANS

Filed Oct. 9, 1926

Inventor
John C. Young
By Dowell & Dowell
His Attorneys

Patented June 19, 1928.

1,674,583

UNITED STATES PATENT OFFICE.

JOHN C. YOUNG, OF NEW GALILEE, PENNSYLVANIA.

RELEASABLE DUMPING-BODY-SECURING MEANS.

Application filed October 9, 1926. Serial No. 140,632.

This invention relates to means for securing vehicle bodies of the dumping type in a fixed position for loading and retaining such bodies in loading position until released for dumping by manually-operated releasing means.

The objects of the invention are to provide simple, efficient, inexpensive and reliable means for releasably locking and holding a dumping body in a fixed loading position without the use of springs or auxiliary fastening means.

The invention will first be hereinafter more particularly described, with reference to the accompanying drawings, which are to be taken as a part of this specification, and then pointed out in the claims at the end of the description.

In said drawings, Fig. 1 is a side elevation of a common form of truck or motor vehicle provided with a dumping body having my improved releasable locking and holding means applied thereto;

Figure 1:
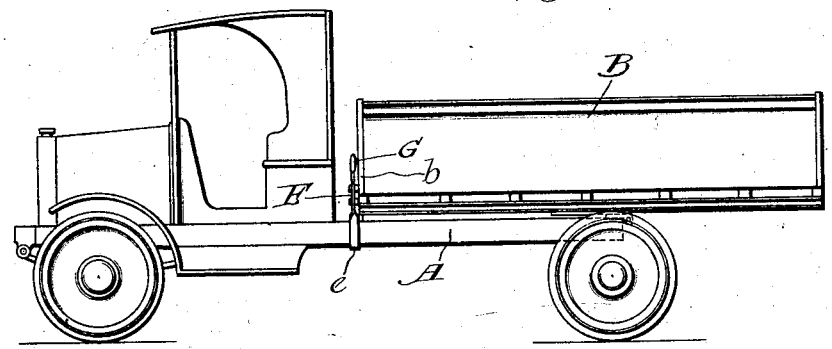

Referring to said drawings, in which the same reference characters are used to denote corresponding parts in different views, the letters A, A, denote the side bars of the frame or chassis of an ordinary motor vehicle or truck of the Fort type having mounted thereon a dumping body B, which in this instance is shown hinged near its rear end to said frame so that its front end may be raised to throw said body into an inclined position for dumping or emptying its contents. Said side bars A are preferably constructed of channel iron or steel arranged so that the flanges on one extend inwardly toward the flanges on the other, but other constructions may be used, as my improved dumping body securing means may be used in connection with various kinds of dumping bodies, whether supported on a chassis or other vehicle frame having side bars which said securing means may engage.

Figure 2:
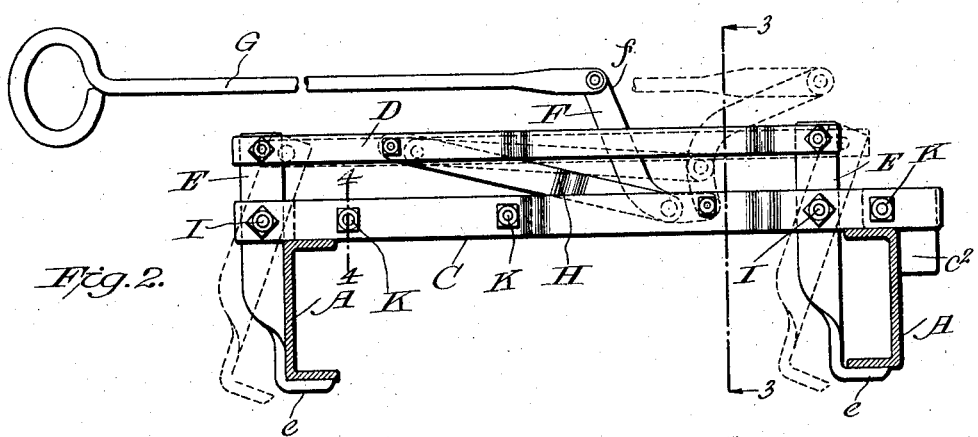
Fig. 2 is a side elevation of the releasable dumping body securing means showing the same in full lines in normal locking position and in dotted lines in released position; parts of the longitudinal bars of the vehicle frame being shown in section.

The illustrated securing means comprises a pair of bars C and D connected in substantially parallel relation by means of a pair of substantially vertical levers E pivoted at a point intermediate their length to the transverse bar C and having their upper ends pivoted to the transverse bar D; the lower ends thereof being formed or provided with toe-pieces e which extend laterally in the same direction and are adapted to take under the side bars A of the chassis or machine frame, as shown more clearly in Fig. 2 of the drawings. F denotes a lever having its lower curved end pivoted to the transverse fixed bar C and an upright arm f to the free end of which is pivoted a longitudinally movable lever G, having a ring-like free end adapted to be grasped by an operator standing beside the machine and pulled or shoved in the direction of its length, for the purpose of engaging or disengaging the toe-pieces of the levers E, E, with the side bars A. A connecting rod or link H, having one end pivoted to the transverse bar D extends inwardly and downwardly therefrom and its lower end is pivoted to the lower curved end of the toggle lever F; said link extending in alinement with its pivotal connection with said toggle lever and with the pivotal connection between said fixed bar and said toggle lever when the upright arm of the latter is in a substantially vertical position, so that when the toggle lever is thrown into position to lock the dumping body in loading position said pivotal connections will be thrown out of alinement, whereby movement of said hand lever will throw the toe-pieces of said laterally swinging levers simultaneously in the same direction and cause them to engage the chassis or vehicle frame, thereby locking the swinging levers and through them locking the dumping body to the vehicle frame.

I thus provide a simple and inexpensive dumping body securing and releasing device which is positive in its action and not liable to get out of order, and which consists of few parts adapted to be easily assembled or taken apart for renewing or repairing any worn or broken part, and which in practical use will serve to positively lock the hinged body to the chassis or vehicle frame on which it is mounted and hold the two parts together without danger of being released accidentally or otherwise than by movement of the operating lever so as to throw the pivotal connection between the toggle lever and link connecting it with the movable bar out of alinement with the fulcrum of the toggle lever.

It will be understood of course that the form of the hand lever and toggle lever and twisted swinging levers may be changed and that various changes may be made in details without departing from the spirit and scope of my invention.

Figure 3:
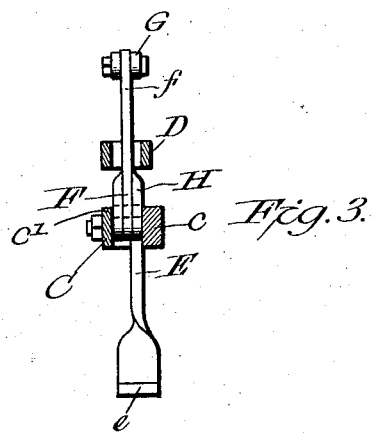
Fig. 3 is a detail sectional view taken on the line 3—3 of Fig. 2.
Figure 4:
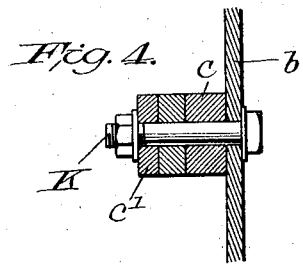
Fig. 4 is a detail sectional view taken on the line 4—4 of Fig. 2.

It will be observed that the fixed and movable bars C and D, as shown in the drawings, are not single bars, as they may be, but composite structures, each consisting of two flat metal bars placed side by side and secured together by fastening bolts. For increased strength and durability, a stout metal bar $c$ and a thin metal bar $c^1$ are used to form the supporting bar C; these two bars being spaced apart sufficiently to receive therebetween the lower end of the toggle lever F, and a bifurcated end portion of the connecting rod or link H which straddles the lower end portion of the toggle lever for pivotal connection therewith, as shown in Figs. 2 and 3, and said bars $c$ and $c^1$ have registering holes therein to receive bolts I, (Fig. 2), which form the pivotal connections between the supporting bar C and the levers E. The vertically disposed swinging levers E are each formed by twisting a piece of flat metal at a point intermediate its length so as to provide an upper portion or shank arranged substantially at right angles to the lower end portion thereof, the extreme lower end being bent laterally to form the toe-piece $e$ arranged to take under the lower flange of the adjacent side bar A of the vehicle frame; said upper end portion or shank being arranged flatwise between the flat metal bars $c$ and $c^1$. The inner flat metal bar $c$ has at one end thereof a depending lug or projection $c^2$ which abuts against one of the side bars A of the vehicle frame at the side thereof opposite the adjacent vertical lever E, so as to prevent sidewise movement of the dumping body when the operating lever is pulled toward the opposite side of the machine into position to lock the dumping body down upon the vehicle frame. The bar D is also shown formed of two flat metal bars secured together side by side and spaced apart to receive therebetween the pivoted end of the link H, and also receive and guide the upper end of the toggle lever F. The supporting bar C may be conveniently secured to the lower front end board $b$ of the dumping body B, as shown, by means of fastening bolts K inserted through registering holes in the two flat metal bars which form the composite bar C and through holes in the front end board of the dumping body. One of these bolts is shown in the detail view—Fig. 4.

Having thus described my invention, what I claim as new and desire to secure by Letters Patent of the United States is:

1. Releasable means for securing a vehicle dumping body in a fixed loading position, comprising a relatively fixed bar adapted for attachment to a dumping body mounted on a vehicle frame, and a longitudinally movable bar arranged substantially parallel with said relatively fixed bar, the latter having pivoted thereto intermediate their ends substantially vertical laterally swinging levers each having an upper arm pivoted to said movable bar and a lower arm formed or provided with a laterally extending toe-piece adapted to take under an adjacent frame bar, an upwardly extending toggle lever having a lower curved end pivoted to said relatively fixed bar, a link pivotally connecting said movable bar with said curved end of said toggle lever, and a hand lever pivoted to the upright arm of said toggle lever, whereby movement of said hand lever will throw the toe-pieces of said laterally swinging levers simultaneously in the same direction causing them to take under the side bars of the vehicle frame and lock and hold said body in a fixed position.

2. Releasable means for securing a vehicle dumping body in a fixed loading position, comprising a pair of bars extending transversely of a vehicle frame having a dumping body mounted thereon, one of said bars being fixed to said body and the other movable lengthwise, the fixed bar having pivoted thereto intermediate their ends a pair of substantially vertical laterally swinging levers each having one arm pivoted to said movable bar and a depending arm formed or provided with a laterally extending toe-piece arranged to take under an adjacent frame bar and hold said body in a fixed loading position, a toggle lever having an upright arm pivoted to a hand lever extending transversely of the vehicle frame and a lower curved end pivoted to said fixed bar, and a link pivotally connecting said lower curved arm of said toggle lever with said movable bar; said link extending in alinement with its pivotal connection with said toggle lever and with the pivotal connection between said fixed bar and said toggle lever when the upright arm of the latter is in a substantially vertical position, so that when the toggle lever is thrown into position to lock the dumping body in loading position said pivotal connections will be thrown out of alinement, whereby movement of said hand lever will throw the toe-pieces of said laterally swinging levers simultaneously in the same direction and cause them to engage the chassis or vehicle frame, thereby locking the swing levers and through them locking the dumping body to the vehicle frame.

3. Releasable means for securing the dumping body of a vehicle in a fixed loading position on its supporting frame, comprising substantially parallel bars one of which is adapted to be fixed on said body while the other is movable, vertically disposed laterally swinging levers each pivoted intermediate its ends to said fixed bar and having an upright arm pivoted to said movable bar and also having on its lower end means for engaging a side bar of said frame so as to hold the dumping body in a fixed position thereon, a toggle lever having its lower end pivoted to said fixed bar and an upright arm pivoted to an operating lever, and a link having one end pivoted to said movable bar and the other end pivoted to said toggle lever; said link extending in alinement with the pivotal connections between it and the toggle lever and between the toggle lever and said fixed bar when said upright arm is in a substantially vertical position, whereby movement of said operating lever will throw said pivotal connections out of alinement with said link and cause said vertical levers to swing simultaneously in the same direction and engage the vehicle frame and lock the dumping body thereon.

4. Releasable means for securing the dumping body of a vehicle in a fixed loading position on its supporting frame, comprising substantially parallel bars extending transversely of said body one of which is adapted to be fixed on said body while the other is movable, vertically disposed laterally swinging levers each pivoted intermediate its ends to said fixed bar and having an upright arm pivoted to said movable bar and also having on its lower end a laterally extending foot-piece for engaging a side bar of said frame so as to hold the dumping body in a fixed position thereon, a toggle lever having its lower end pivoted to said fixed bar and an upright arm pivoted to a lengthwise movable operating lever which extends transversely of said body to a point within convenient reach of an operator standing beside the vehicle, and a link having one end pivoted to said movable bar and the other end pivoted to said toggle lever; said link extending in alinement with the pivotal connections between it and the toggle lever and between the toggle lever and said fixed bar when the upright arm of said toggle lever is in a substantially vertical position, whereby movement of said operating lever will throw said pivotal connections out of alinement with said link and cause said vertical levers to swing simultaneously in the same direction thus causing said foot-pieces to engage the vehicle frame and lock the dumping body thereon.

5. Releasable means for securing the dumping body of a vehicle in a fixed loading position on its supporting frame, comprising substantially parallel bars extending transversely of said body one of which is adapted to be fixed on said body while the other is movable, vertically disposed laterally swinging levers each pivoted intermediate its ends to said fixed bar and having an upright arm pivoted to said movable bar and a lower end adapted to engage the vehicle frame and secure the dumping body in a fixed position thereon, a curved lever pivoted on said fixed bar having one arm connected with an operating lever, and a link pivoted at opposite ends thereof to said curved lever and said movable bar; the pivotal connection between said link and said curved lever being arranged normally out of alinement with the pivotal connections between said link and said movable bar and between said curved lever and said fixed bar, so that when said swinging levers are caused to engage the vehicle frame the pivotal connections between the curved lever and link and the fixed and movable bars will be thrown into locked position.

6. Releasable means for securing the dumping body of a vehicle in a fixed loading position on its supporting frame, said means comprising substantially parallel bars extending transversely of said body, one of which is adapted to be fixed and the other movable in the direction of its length, a pair of swinging levers each pivoted intermediate its ends to said fixed bar and having an upright arm pivoted to said movable bar and a lower end-portion adapted to engage the vehicle frame and secure the dumping body in a fixed position thereon, a lever pivoted at one end to said fixed bar and having its other end connected with an operating lever provided with a handle arranged at one side of the vehicle, and a link pivoted at opposite ends thereof to the first named lever and said movable bar; the pivotal connection between said link and said first named lever being arranged normally out of alinement with the pivotal connections between said link and said movable bar and between said first named lever and said fixed bar, so that when said swinging levers are caused to engage the vehicle frame the pivotal connections between said first named lever and link and the fixed and movable bars will be thrown into locked position.

In testimony whereof I affix my signaure.

JOHN C. YOUNG.